United States Patent
Harris

[11] 3,826,033
[45] July 30, 1974

[54] FISH LURE
[76] Inventor: Ewell J. Harris, Route No. 3, Box 135A, Adrian, Mich. 49221
[22] Filed: Apr. 21, 1972
[21] Appl. No.: 264,721

[52] U.S. Cl. ............................................. 43/42.5
[51] Int. Cl. .......................................... A01k 85/00
[58] Field of Search ................................. 43/42.5

[56] References Cited
UNITED STATES PATENTS

| | | | |
|---|---|---|---|
| 1,770,003 | 7/1930 | Miller | 43/42.5 |
| 1,803,056 | 4/1931 | Davis | 43/42.5 |
| 1,938,653 | 12/1933 | Bardon | 43/42.5 |
| 3,497,986 | 3/1970 | Bianco | 43/42.5 |

Primary Examiner—Daniel J. Leach

[57] ABSTRACT

A fishing lure made of sheet material having a longitudinally extending generally planar center portion with opposite side contoured portions which are beveled to deflect water to the same side of the plane of the center portion and which causes a continually reversing direction of roll about a generally longitudinal axis as the lure is pulled through water.

8 Claims, 8 Drawing Figures

PATENTED JUL 30 1974 3,826,033

3,826,033

FISH LURE

BACKGROUND OF THE INVENTION

The prior art has produced a number of designs of bent plate artificial fishing lures which are sometimes called spoons, and which produce a wobbling action when pulled through the water. Some of these lures produce a side-to-side wobbling action about a vertical plane as they are pulled through the water; and some of the lures produce a generally up-and-down zig-zag motion as they are pulled through the water. Still other types of spoons spiral around in a helical motion as they are pulled through the water. In each of the above mentioned types of spoons there may be some rolling action along its longitudinal axis, but in these prior art spoons, the rolling action is generally minor relative to one of the other types of wobbling action. It is believed by the writer that zig-zag motions, be it from side-to-side or up-and-down, or spiralled around the centerline of the path of movement of the lure, are unnatural; and that while these prior art types of motion may attract or get the attention of fish, they at the same time present an unfamiliar situation which in some fish is instinctively sensed as a danger causing a reticence to strike the lure.

An object of the present invention, therefore, is the provision of a new and improved lure which will continually reverse direction of rotation about its longitudinal axis as it moves through the water.

Another object of the present invention is the provision of a new and improved lure of the above described type which has an up-and-down or side-to-side motion that is generally minor and which is greater at the trailing end of the lure than it is at the leading end of the lure. A minor side-to-side or up-and-down movement of the trailing end portion of the lure is quite natural, particularly when it is greater than that displayed by the leading end of the lure.

A still further object of the invention is the provision of a new and improved fish lure that is made from a single piece of sheet material and which has a new and improved unique wobbling action.

Still further objects and advantages of the invention will become apparent to those skilled in the art to which the invention relates from the following description of the preferred embodiments described with reference to the accompanying drawing forming a part of this specification.

DESCRIPTION OF THE PREFERRED EMBODIMENTS

Figure 1:
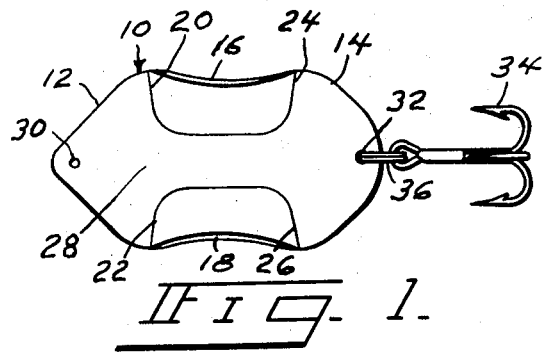
FIG. 1 is a plan view of one embodiment of the present invention.
Figure 2:
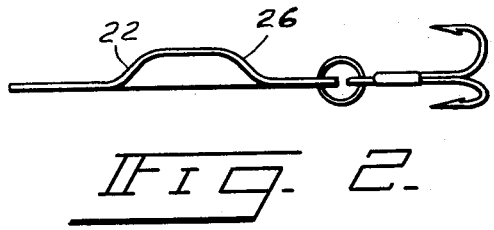
FIG. 2 is a side view of the embodiment shown in FIG. 1.
Figure 3:
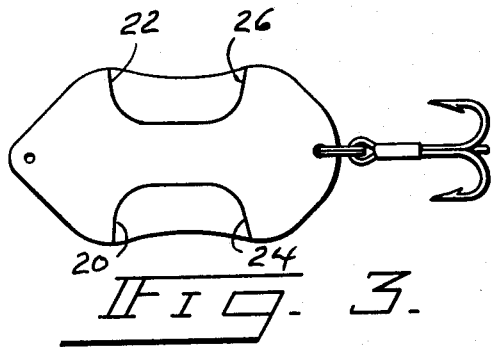
FIG. 3 is a bottom view of the embodiment shown in FIGS. 1 and 2.
Figure 4:
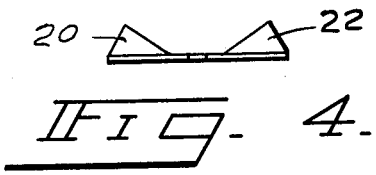
FIG. 4 is a front view of the embodiment shown in FIGS. 1 through 3.

The lure shown in FIGS. 1 through 4 is made from a single piece of sheet material, as for example, sheet metal. The body 10 is generally elongated and has tapered front and rear ends, with the angle of taper of the front end being greater than the angle of taper of the rear end. Opposite side edge portions of the body 10, intermediate the ends of the body, are bent upwardly to provide contoured portions 16 and 18 which have forwardly facing vanes or bevels 20 and 22 respectively. In the present embodiment these vanes provide a transition between the flat plane of the sheet material and the upper regions of the contoured portions 16 and 18, but they need not do so in all instances. Since in the embodiment shown, the portions 16 and 18 comprise a center section of the side edge portions of the lure, the contoured portions 16 and 18 also have rearwardly facing vanes or bevels 24 and 26 respectively, the bottom sides of which provide forwardly facing vanes or bevels which slope downwardly and rearwardly with their laterally outer side edges being spaced rearwardly of the edges that are adjacent the center of the lure. The rearwardly facing vanes or bevels 24 and 26 are not necessary in all instances, since the lures can be made with the contoured portion extending rearwardly to intersect the rear tapered edge 14. Similarly the bevels 20 and 22 are not necessary in all instances since the contoured portions could be made to intersect the front tapered edge 12 so that each contoured portion would have a single end positioned bevel or vane. Front and rear bevels on each contoured portion augment each other, and generally increase the amount of wobbling action produced when the lure is drawn through water. Intermediate the contoured portions 16 and 18 is a planar longitudinally extending center section 28 which extends from the front tapered edge 12 to the rear tapered edge 14. A hole 30 is provided through the lure at the front end of the planar section 28 to provide means for attaching a fish line thereto, and a hole 32 is provided adjacent the rear of the planar section 28 for attaching a hook 34 thereto by means of a split ring 36.

The body 10 is heavier than water, and when it is drawn through water by means of a fish line extending to the surface, the front end 12 is pulled slightly upwardly of its rear end 14. The body 10 will position itself in the water so that its contours 16 and 18 extend upwardly, and so that the forwardly facing vanes 20 and 22 will be forced downwardly by the water. If the rear end 14 of the lure is positioned slightly to the side of the path of the lure through the water, the water will exert a greater force on one of the vanes 20 and 22 than it exerts on the other vane. This will cause the vane on the side opposite the side to which the rear end is positioned to move downwardly relative to the other side of the lure to produce rotation about the longitudinal axis of the lure. As the lure approaches a vertical position, there will no longer be a planing action of the water on the lure and the rear end of the lure will sink. Once the rear end of the lure has moved downwardly, the upper beveled edge will be more normal to the path of water and greater force will be exerted on it than is exerted on the lower bevel or vane, and the lure will now rotate about its longitudinal axis in the opposite direction. This process is repeated with but a small movement of the rear end of the lure about its longitudinal path through the water. It can now be seen that the rear bevels or vanes 24 and 26 of the contoured portions will augment the action provided by the vanes 20 and 22. When the vane 20, for example, is normal to the path of water, it will cause its side of the lure to move downwardly. At the same time, the bottom side of the vane 26 will also be normal to the path through the water, and vane 26 will cause its side of the lure to rotate upwardly to produce a couple with the vane 20. The vane 24 likewise produces a couple with the vane 22, so that in this embodiment of lure, the oscillation above the longitudinal axis of the lure will be quite rapid. The slight side-to-side movement of the rear end of the lure caused by its sinking action, causes the vanes to be alternately "dumped" and "loaded" with respect to their "cupping" action of the water.

Figure 5:
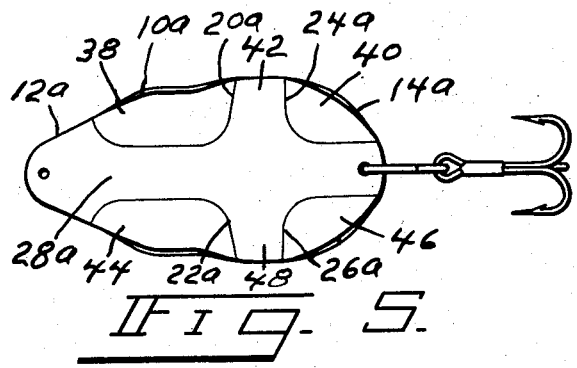
FIG. 5 is a plan view of another embodiment of the present invention.
Figure 6:
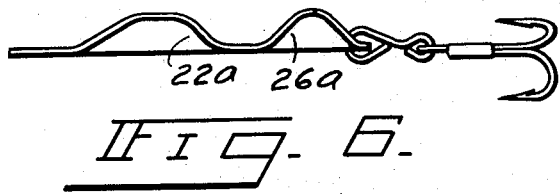
FIG. 6 is a side view of the embodiment shown in FIG. 5.
Figure 7:
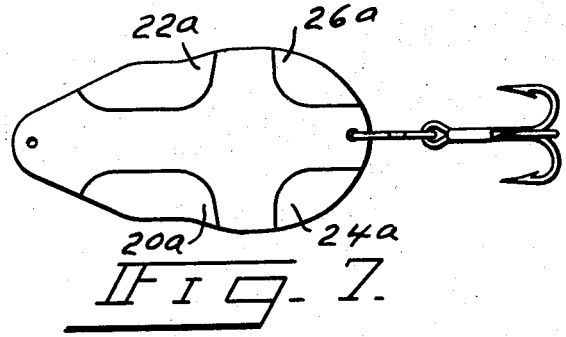
FIG. 7 is a bottom view of the embodiment shown in FIGS. 5 and 6.
Figure 8:
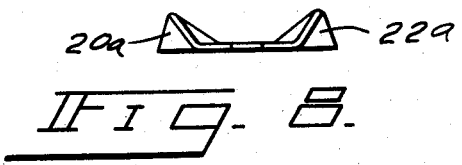
FIG. 8 is a front view of the embodiment shown in FIGS. 5 through 7.

The embodiment of lure shown in FIGS. 5 through 8 is similar to the embodiment shown in FIGS. 1 through 4 in many respects, but differs principally therefrom in the manner in which the vanes are made. Those portions of the embodiment shown in FIGS. 5 through 8 which are similar to those in the embodiment shown in FIGS. 1 through 4 are designated by a like reference numeral characterized further and that a suffix "a" is affixed thereto.

In the embodiment shown in FIGS. 5 through 8, the vanes 20a and 24a are formed by front and rear contoured portions 38 and 40, respectively, that are positioned on opposite sides of a flat lateral portion 42, that is coplanar with the longitudinally extending center planar section 28a. Similarly, vanes 22a and 26a are formed by front and rear contoured portions 44 and 46 respectively, which lie on opposite sides of a lateral coplanar portion 48. The bulk of the contoured portions 38 and 40 lie in a plane that is at an acute angle to the plane of the center section 28a, and likewise the bulk of the portions 44 and 46 lie in a plane that is at an acute angle to the plane of the center portion 28a. Both acute angles will be on the same side of the plane of the center section 28a, and the vanes 20a, 22a, 24a, and 26a will form a transition between the respective acute planes and the plane of the center section 28a. It will be apparent that only one pair of bevels is required in most instances in which case either the front side contoured portions, or the rear side contoured portions can be eliminated. Where the rear side portions are eliminated, for example, the bevels 20a and 22a will be formed, but the bevels 24a and 26a will be omitted. With the embodiment of the lure shown in FIGS. 5 through 8 the lure will position itself in the water with the contoured portions extending upwardly.

It will be apparent that the lures above described can be made by suitably molding plastic, or can be made by suitably bending pieces of flat metal. The word "bevel" is used in the description and the accompanying claims to connote a surface that is inclined relative to the flow of water past the lure, and not necessarily as a connecting portion to planar areas of the lure. In some instances, for example, the bevels or vanes can be provided by horizontal projections from the main body portion of the lure, which projections are inclined at an angle relative to the longitudinal surfaces of the lure. Such embodiments, however, are not preferred inasmuch as weeds, etc. tend to be caught by such lateral projections. It will also be apparent that the body can be generally as wide or wider than it is long, but this is not to be preferred since it gives an excessive wobbling action. The ends of the lure may have various shapes, but a tapered shape is preferred, at least on the leading edge, since a tapered configuration tends to deflect weeds and prevent the lure body and trailing hook from becoming caught on the weeds.

While the invention has been described in considerable detail, I do not wish to be limited to the particular embodiments shown and described, and it is my intention to cover hereby all novel adaptations, modifications and arrangements thereof which come within the practice of those skilled in the art to which the invention relates, and which fall within the perview of the following claims.

I claim:

1. A fishing lure comprising: a body of sheet material of generally uniform thickness and having a longitudinal center line, said body having a generally planar longitudinally extending center section with front and rear end portions and a coplanar transverse section extending between opposite side edges of said body and having a centerline normal to the longitudinal center line of the lure, said body having a pair of contoured portions respective ones of which extend to opposite edges from said planar center section and which extend upwardly and outwardly at an acute angle to said plane, said contoured portions forming bevels with said coplanar transverse section which extend forwardly or rearwardly of the centerline of the transverse section, and whereby the sinking action of the rear of the lure when the lure is near a vertical position dumps one bevel and loads the other to reverse direction of rotation of the lure.

2. The fish line of claim 1 wherein said body is an integral piece of sheet metal.

3. The fish lure of claim 1 wherein said body includes leading edge portions forwardly of said beveled portions and to which said contoured portions extend.

4. The fish lure of claim 3 wherein said leading edge portions have a tapered leading edge.

5. A fishing lure comprising: a body of flat sheet material of generally uniform thickness and having upper and lower surfaces, said body being of elongated configuration and having front and rear end portions, said upper surface of said body having a pair of water deflecting forwardly facing beveled portions which slope upwardly and rearwardly with the laterally outer side edges being spaced forwardly of their edges that are adjacent the center of said lure, said lower surface of said body having a pair of water deflecting forwardly facing beveled portions which slope downwardly and rearwardly with their laterally outer side edges being spaced rearwardly of their edges that are adjacent the center of the lure, and means for attaching a fish line and a fish hook to said front and rear end portions respectively, and whereby said lure continually reverses direction of rotation about its longitudinal axis when pulled through water.

6. The fishing lure of claim 5 wherein said upper and lower water deflecting beveled portions are on rear and front sides respectively of a transverse planar portion.

7. The fishing lure of claim 5 wherein said upper and lower water deflecting beveled portions are formed by a contoured side edge portion that is intermediate front and rear coplanar portions.

8. A fishing lure comprising: a body of sheet material of generally uniform thickness and having top and bottom surfaces, said body having a generally planar longitudinally extending center section with front and rear end portions, means for attaching a fish line and a fish hook to said front and rear end portions respectively, said body having a pair of vanes respective ones of which project from opposite sides of said center portion with the top surface of said vanes being inclined upwardly and rearwardly and with the laterally outer edges of said vanes being positioned forwardly of the portions of said vanes that are adjacent said longitudinally extending center section of said lure, and whereby said lure continually reverses direction of rotation about its longitudinal axis when pulled through water.

* * * * *